(12) United States Patent
Huang

(10) Patent No.: US 9,898,094 B2
(45) Date of Patent: Feb. 20, 2018

(54) ASSEMBLABLE KEYBOARD AND ASSEMBLABLE KEY

(71) Applicant: PRIMAX ELECTRONICS LTD., Taipei (TW)

(72) Inventor: Wei-Yung Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 119 days.

(21) Appl. No.: 15/189,393

(22) Filed: Jun. 22, 2016

(65) Prior Publication Data

US 2017/0308178 A1    Oct. 26, 2017

(30) Foreign Application Priority Data

Apr. 22, 2016  (TW) .............................. 105112646 A

(51) Int. Cl.
  *G06F 3/02*  (2006.01)
  *G06F 3/023*  (2006.01)
  *H01H 13/84*  (2006.01)

(52) U.S. Cl.
  CPC .......... *G06F 3/0216* (2013.01); *G06F 3/0221* (2013.01); *G06F 3/0233* (2013.01); *H01H 13/84* (2013.01)

(58) Field of Classification Search
  CPC .... G06F 3/0213; G06F 3/0233; G06F 3/0221; H01H 13/84
  See application file for complete search history.

(56) References Cited

U.S. PATENT DOCUMENTS

| | | | | |
|---|---|---|---|---|
| 3,773,998 A | * | 11/1973 | Seeger, Jr. ............. | H01H 13/14 200/330 |
| 4,602,138 A | * | 7/1986 | Berutto ................... | H01H 13/70 200/295 |
| 4,918,271 A | * | 4/1990 | Deeg ....................... | H01H 13/14 200/344 |
| 8,414,207 B1 | * | 4/2013 | Knighton .................. | G06F 3/02 400/485 |
| 8,896,539 B2 | * | 11/2014 | Knighton .............. | G06F 3/0202 345/168 |
| 2004/0085716 A1 | * | 5/2004 | Uke ....................... | G06F 3/0202 361/679.08 |
| 2007/0045392 A1 | * | 3/2007 | Youens ................. | G06F 1/1632 235/145 R |

* cited by examiner

*Primary Examiner* — Mihir K Rayan
(74) *Attorney, Agent, or Firm* — Kirton McConkie; Evan R. Witt

(57) ABSTRACT

An assemblable keyboard includes plural assemblable keys and a main control key. Each assemblable key can be triggered to generate a key signal. The assemblable key includes a pedestal, a key structure and a conductive structure. The main control key includes a key processor and a transmission interface. The assemblable key includes plural coupling structures with the conductive structure. Every two adjacent assemblable keys are combined together and electrically connected with each other through the corresponding coupling structures. After the key signal generated by each assemblable key is transmitted to the main control key, the key signal is further outputted to a computer host. The layout space of the assemblable keyboard is reduced. Moreover, the assembling flexibility of the keyboard is enhanced.

12 Claims, 5 Drawing Sheets

ASSEMBLABLE KEYBOARD AND ASSEMBLABLE KEY

FIELD OF THE INVENTION

The present invention relates to an assemblable keyboard and an assemblable key, and more particularly to a self-assemblable keyboard and a self-assemblable key that are assembled by the user according to the practical demands.

BACKGROUND OF THE INVENTION

As known, computers such as desktop computer (e.g., personal computers) or notebook computers become essential tools in our daily lives. Moreover, keyboards are important input devices of computers. Via the keyboards, users can input characters or perform control operations.

Generally, the keyboard module of the computer or the computer system has a standard key layout. The keyboard module with the standard key layout is a standard QWERTY keyboard. For example, this keyboard module comprises 26 English alphabetic letters and other function keys. The 26 English alphabetic letters are located at specified positions. The function keys such as the arrow keys, the space key, the Enter key, the Ctrl keys, the Alt keys and the Shift keys are arranged around these alphabetic letters.

In other words, the standard keyboard module has a specified size and occupies much space. Especially, the keyboard module of the desktop computer is independently installed. Moreover, the keyboard module of the desktop computer is usually equipped with an additional numerical keypad for allowing the user to input numbers quickly. Moreover, in some working situations such as the playing or drawing situations, it is not necessary to use all keys of the keyboard module. When the keyboard module is placed on a desk surface, the operating space of the user is limited.

For solving the above drawbacks, an assemblable keyboard has been introduced into the market. This assemblable keyboard allows the user to select the desired keys and self-assemble the selected keys. Moreover, by editing a supporting program, the characters or functions corresponding to the selected keys can be defined. Moreover, the function of a combination key (e.g., Ctrl+Z) can be set through a single key. Since the undesired keys are discarded, the overall size of the assembled keyboard is largely reduced. The associated technologies are described in a building block style keyboard Trickey (which was developed by engineering students in University of Tokyo) or Chinese utility model patent 202616109U.

For allowing the selected keys to be electrically connected with each other to transmit signal, the assemblable keyboard comprises a base (or a pedestal) to accommodate plural keys. Moreover, electric connection interfaces corresponding to the circuit board are installed in the base. For example, these electric connection interfaces comprise metal plates, insertion slots and connecting ports. Through the electric connection interfaces, the selected keys are combined together and electrically connected with each other. Moreover, the base is in communication with a computer host through a transmission wire.

However, the conventional assemblable keyboard still has some drawbacks. For example, if the number of keys selected by the user is larger than the number of keys that can be accommodated by the base, the base has to be combined with and electrically connected with an additional base. Consequently, the function of the assemblable keyboard can be expanded. That is, the configuration of the assembled keys, the positions of the assembled keys or the number of the assembled keys will be restricted by the shape of the base and the number of keys that can be accommodated by the base. If the number of the keys to be selected or expanded is smaller than the number of keys that can be accommodated by the base, the unavailable assembling interfaces of the base waste the space of the base. Since the volume of the assembled keyboard is still large, the assemblable keyboard with the expanded base is not user-friendly. In other words, the structural design of the conventional assemblable keyboard is not flexible to the user.

SUMMARY OF THE INVENTION

An object of the present invention provides an assemblable keyboard and an assemblable key. Since two or more assemblable keys are combined together without the need of using a shared base, the layout space of the assemblable keyboard is saved. Moreover, the assembling flexibility of the keyboard is enhanced.

In accordance with an aspect of the present invention, there is provided an assemblable keyboard. The assemblable keyboard includes plural assemblable keys and a main control key. Each of the plural assemblable keys includes a pedestal, a key structure and a conductive structure. The pedestal includes a frame and a first coupling structure or a second coupling structure. The first coupling structure or the second coupling structure is formed on a lateral wall of the frame. The key structure is disposed within the frame of the pedestal to generate a key signal. Moreover, one of the plural assemblable keys with the first coupling structure and an adjacent assemblable key of the plural assemblable keys with the second coupling structure are combined together through engagement between the first coupling structure and the second coupling structure. The conductive structure is disposed under the key structure and extended to the first coupling structure or the second coupling structure of the frame. When the key structure is depressed, the key signal is generated and the key signal is transmitted to the adjacent assemblable key through the first coupling structure and the second coupling structure. The main control key is electrically connected with a specified assemblable key of the plural assemblable keys, and includes a keyboard processor and a transmission interface. The key signal is processed by the keyboard processor. The transmission interface is electrically connected with the keyboard processor. The key signal is transmitted to a computer host through the transmission interface.

In accordance with another aspect of the present invention, there is provided an assemblable key. The assemblable key includes a pedestal, a key structure and a conductive structure. The pedestal includes a frame and a first coupling structure or a second coupling structure. The first coupling structure or the second coupling structure is formed on a lateral wall of the frame. The key structure is disposed within the frame of the pedestal to generate a key signal. The assemblable key with the first coupling structure and an adjacent assemblable key with the second coupling structure are combined together through engagement between the first coupling structure and the second coupling structure. The conductive structure is disposed under the key structure and extended to the first coupling structure or the second coupling structure of the frame. When the key structure is depressed, the key signal is generated and the key signal is transmitted to the adjacent assemblable key through the first coupling structure and the second coupling structure.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1A:
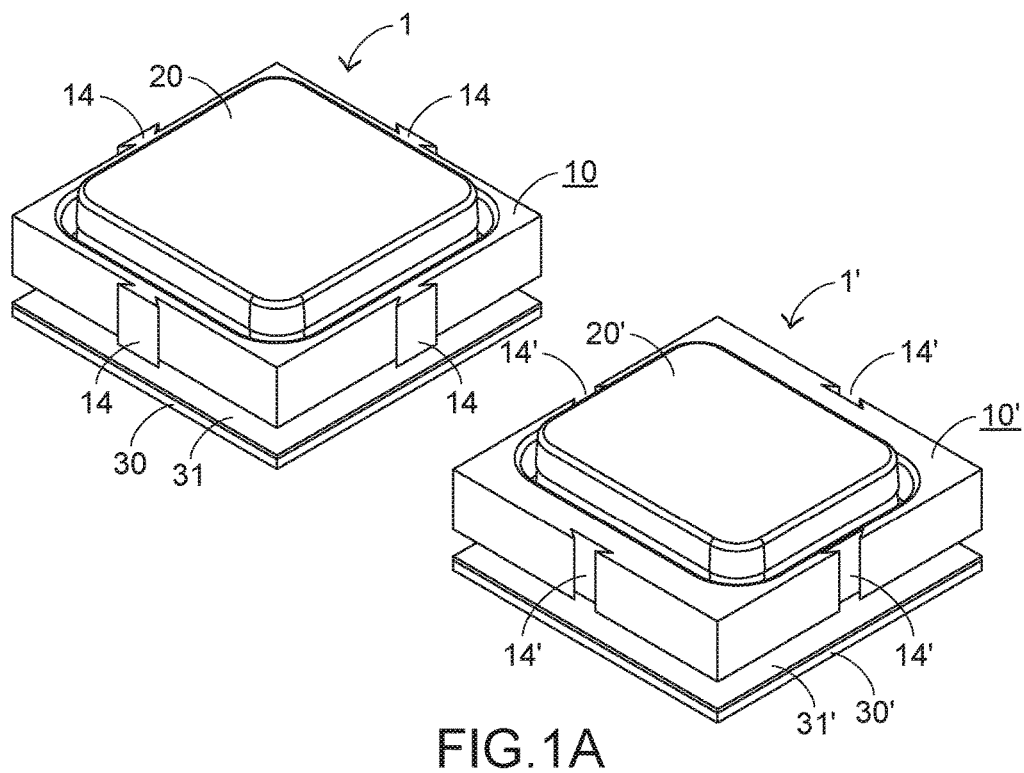
FIG. 1A is a schematic perspective view illustrating two assemblable keys in a separate status according to an embodiment of the present invention.
Figure 1B:
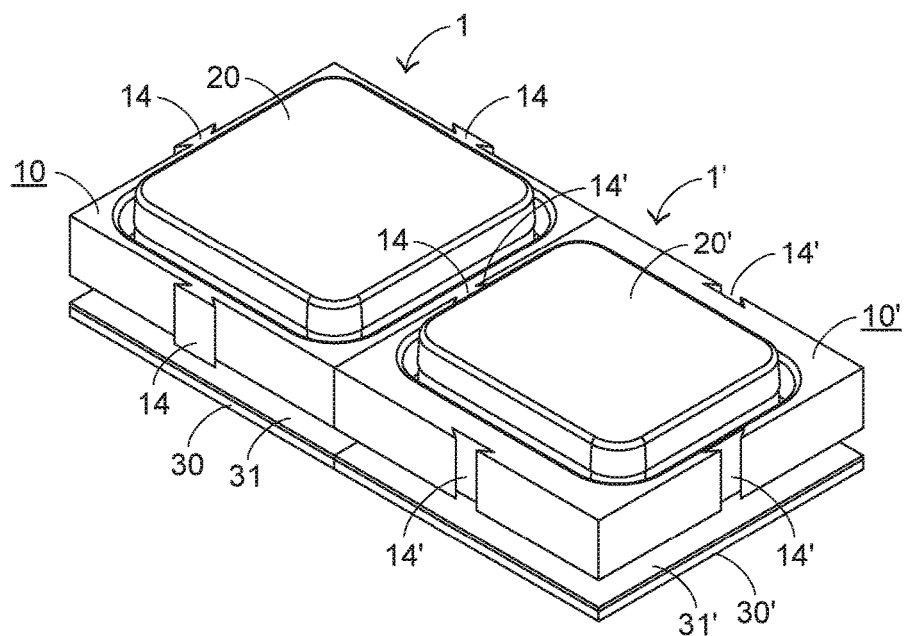
FIG. 1B is a schematic perspective view illustrating the two assemblable keys of FIG. 1A in a combined status.
Figure 1C:
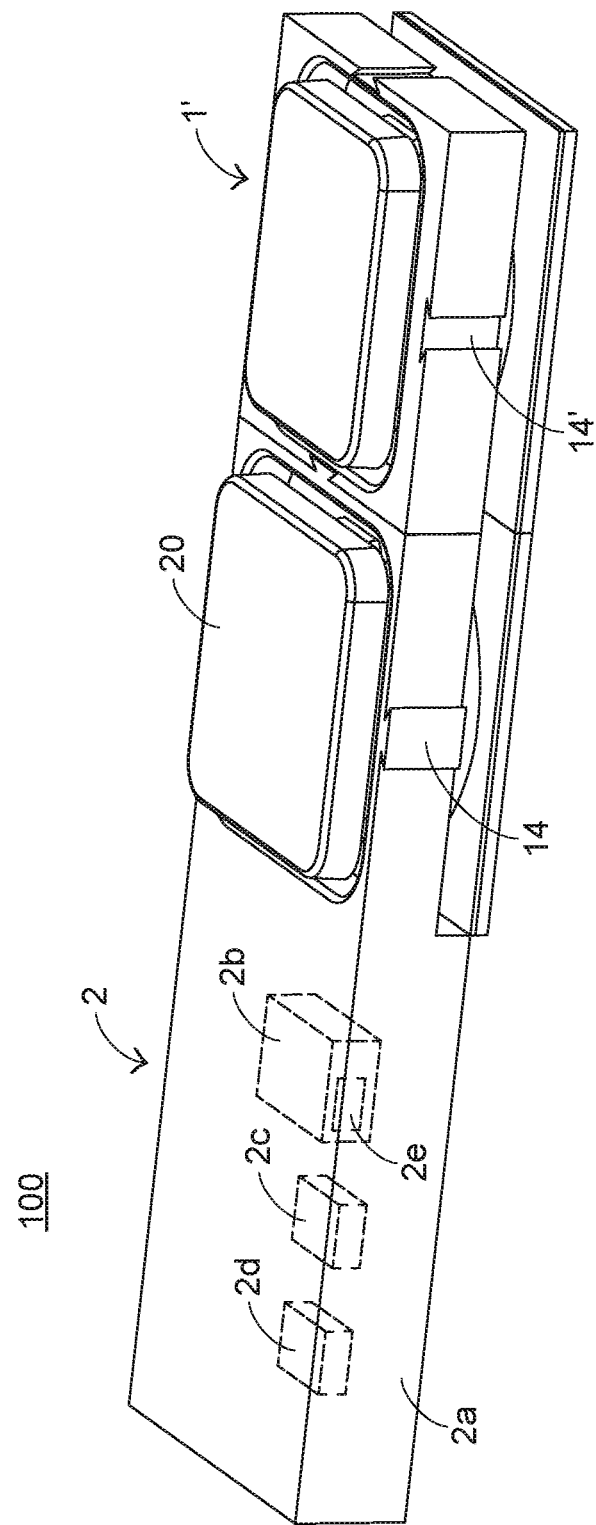
FIG. 1C is a schematic perspective view illustrating a main control key and an assemblable key of an assemblable keyboard according to an embodiment of the present invention.

Hereinafter, an example of an assemblable key will be illustrated with reference to FIGS. 1A, 1B and 1C. FIG 1A is a schematic perspective view illustrating two assemblable keys in a separate status according to an embodiment of the present invention. FIG. 1B is a schematic perspective view illustrating the two assemblable keys of FIG 1A in a combined status. FIG. 1C is a schematic perspective view illustrating a main control key and an assemblable key of an assemblable keyboard according to an embodiment of the present invention.

The assemblable keyboard can be applied to a host (not shown) of a computer, especially a desktop computer or a personal computer (PC). Via the assemblable keyboard, the user can input characters or perform control operations.

As shown in the drawings, the assemblable keyboard 100 comprises at least one assemblable key 1, 1' and a main control key 2. For succinctness, only one assemblable key is shown. Each assemblable key provides the function of an independent key. Moreover, the number of the assemblable keys of the assemblable keyboard 100 can be determined according to the operational demand of the user. Moreover, by editing a supporting program, a predetermined character or a predetermined function of each assemblable key is defined.

In this embodiment, only one assemblable key 1' is described as an example. It is noted that the concepts of the present invention are not restricted. For example, in case that a keyboard with a set of arrow keys is required, the user only needs to assemble four assemblable keys. Alternatively, in case that a keyboard with a space key or an Enter key is required, a main control key is needed. Like the conventional technology, a single assemblable key 1 is set to have the function of a combination key (e.g., Ctrl+Z) by editing the supporting program.

The assemblable key 1 comprises plural first coupling structures 14. The assemblable key 1' comprises plural second coupling structures 14'. When the first coupling structures 14 and the corresponding second coupling structures 14' are engaged with each other, the assemblable key 1 and 1' are combined together. In accordance with a feature of the present invention, the positions of different assemblable keys can be determined by the user. In addition, an expansion interface with two or more assemblable keys can be assembled and connected in a specified arrangement. For example, at least two assemblable keys are connected in a linear arrangement, at least three assemblable keys are connected in an L-shaped arrangement, at least four assemblable keys are connected in a T-shaped arrangement, or at least five assemblable keys are connected in a crisscross arrangement.

In accordance with another feature, a conductive structure is printed on the first coupling structures 14 and the second coupling structures 14'. The functions of the conductive structure will be described later. When the first coupling structure 14 and the corresponding second coupling structure 14' are engaged with each other, the corresponding assemblable keys are combined together and not detached from each other. Moreover, when the first coupling structure 14 and the corresponding second coupling structure 14' are engaged with each other, the corresponding assemblable keys are electrically connected with each other to transmit signals. Moreover, the assemblable keyboard 100 is in communication with the host of the computer in a wired transmission manner or a wireless transmission manner. Consequently, the assemblable keyboard 100 and the host of the computer are connected with each other to transmit signals. Particularly, through the main control key 2 of the assemblable keyboard 100, the key signal generated by each assemblable key is transmitted to the host of the computer. As shown in FIG. 1C, the assemblable keyboard 100 comprises one main control key 2 and one assemblable key 1'. The main control key 2 comprises a main control key pedestal 2a, a key structure, a keyboard processor 2b, a transmission interface 2c and a wireless signal receiver 2d. The key structure of the main control key 2 is similar to a key structure 20 of the assemblable key 1 or a key structure 20' of the assemblable key 1'. As shown in FIG. 1C, the key structure of the main control key 2 is similar to the key structure 20 of the assemblable key 1, and the main control key 2 further comprises the first coupling structures 14. The first coupling structures 14 are installed in the main control key pedestal 2a. When the first coupling structure 14 of the main control key 2 and the second coupling structure 14' of the assemblable key 1' are engaged with each other, the main control key 2 and the assemblable key 1' are combined together and electrically connected with each other. Moreover, the keyboard processor 2b, the transmission interface 2c and the wireless signal receiver 2d are installed in the main control key pedestal 2a. The keyboard processor 2b is used for receiving and processing the key signal from each assemblable key. The keyboard processor 2b further comprises a key defining program 2e. The key defining program 2e receives a key edit command from an external application program. According to the key edit command, the symbols or functions of all assemblable keys of the assemblable keyboard can be defined. After the signal is processed by the keyboard processor 2b, the processed signal is transmitted to the computer through a transmission interface 2c such as a USB transmission interface. In case that the application program is installed in a handheld device such as a mobile phone or a tablet computer, the key edit command is transmitted from the handheld device to the wireless signal receiver 2d according to a wireless transmission technology such as a Bluetooth transmission technology, a Wi-Fi transmission technology, an infrared transmission technology or a ZigBee transmission technology. It is noted that numerous modifications and alterations may be made while retaining the teachings of the invention. For example, in some other embodiments, the main control key 2 is not equipped with the key structure. Under this circumstance, the main control key 2 only provides the function of processing signals.

Figure 2A:
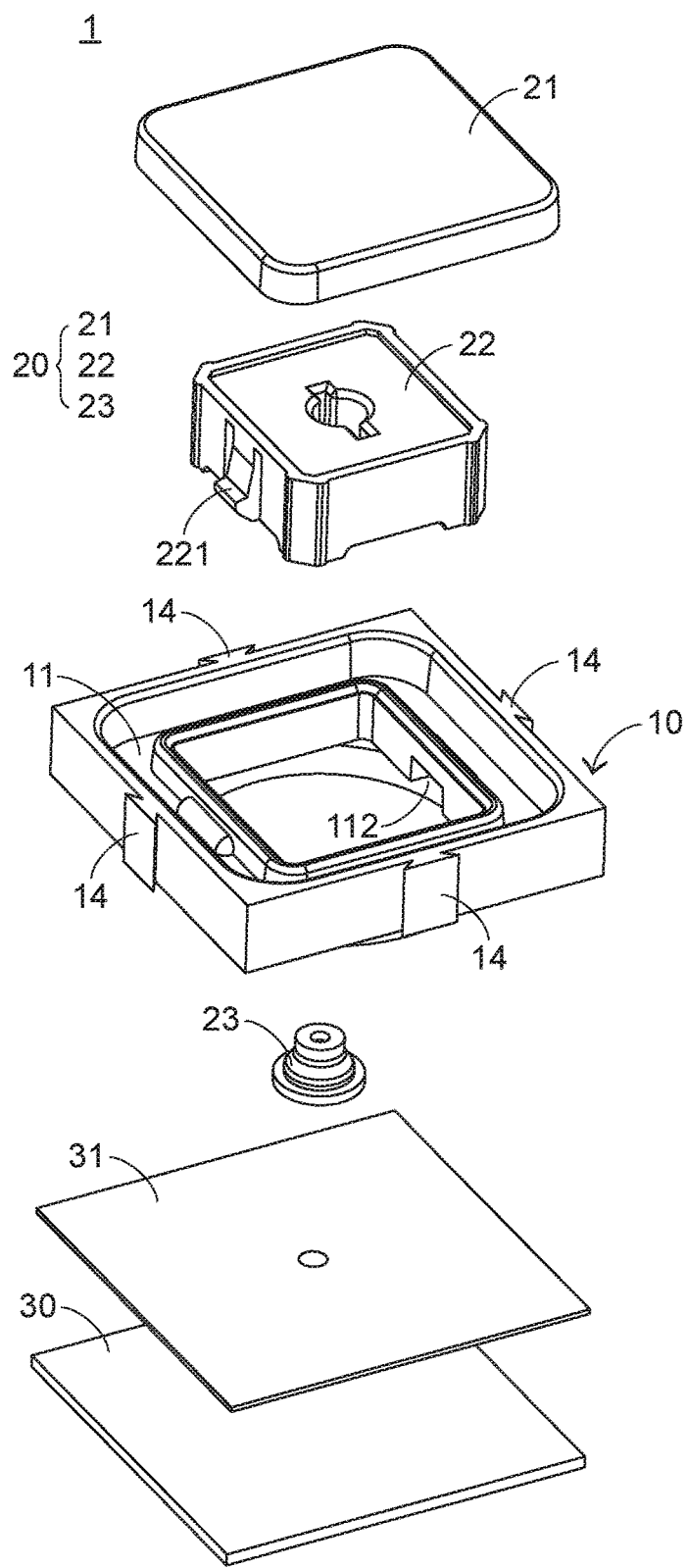
FIG. 2A is a schematic exploded view illustrating the assemblable key of the assemblable keyboard according to the embodiment of the present invention.
Figure 2B:
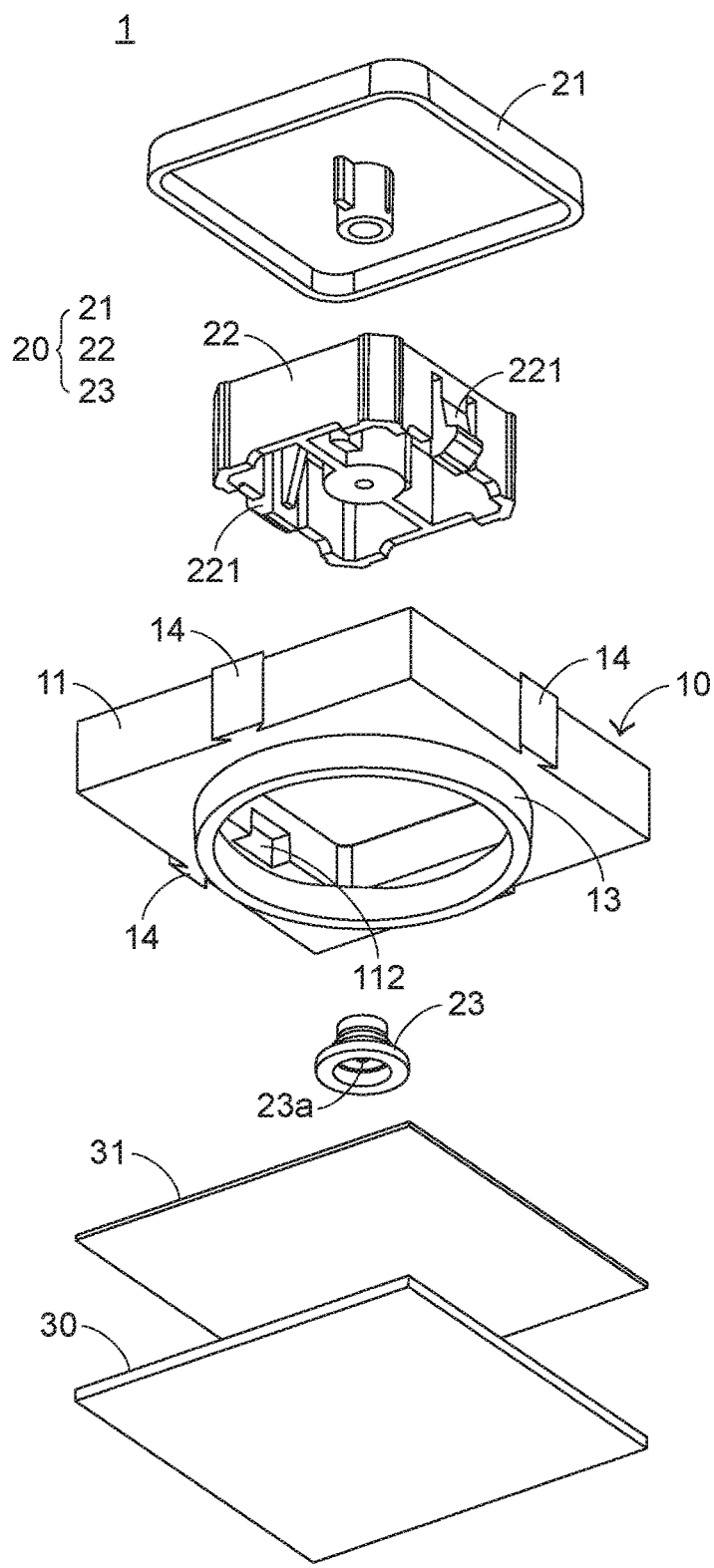
FIG. 2B is a schematic exploded view illustrating the assemblable key of FIG. 2A and taken along another viewpoint.
Figure 3A:
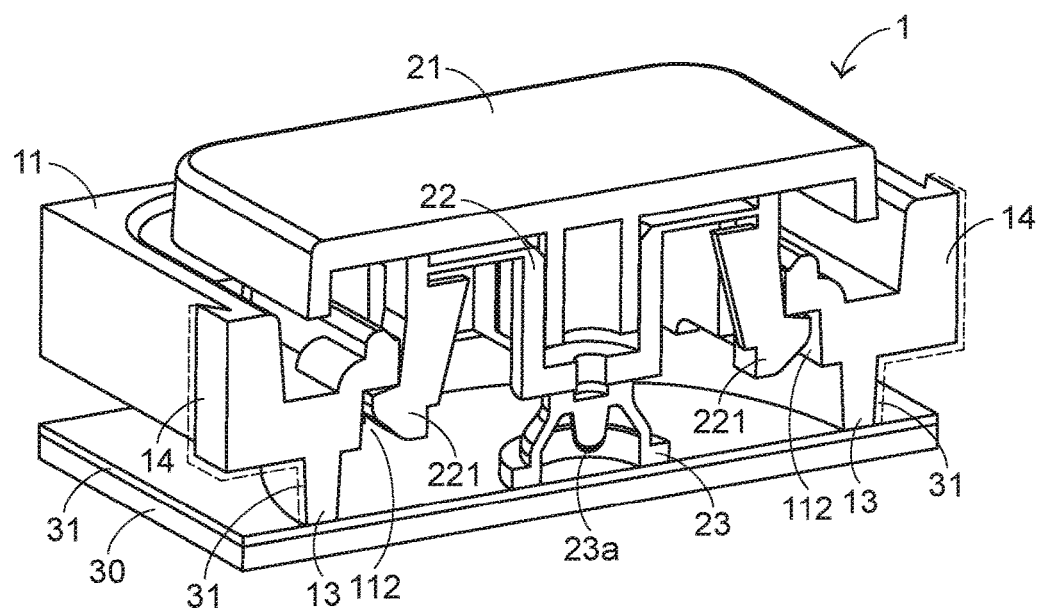
FIG. 3A is a schematic cutaway view illustrating the assemblable key of the assemblable keyboard according to the embodiment of the present invention.
Figure 3B:
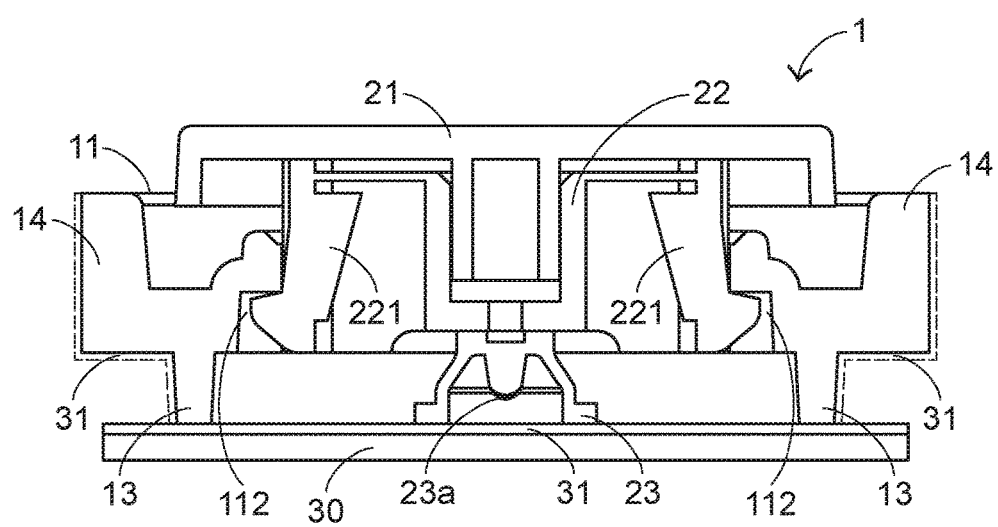
FIG. 3B is a schematic side view illustrating the assemblable key of FIG. 3A.

The structure of the assemblable key will be illustrated in more details as follows. FIG. 2A is a schematic exploded view illustrating the assemblable key of the assemblable keyboard according to the embodiment of the present invention. FIG. 2B is a schematic exploded view illustrating the assemblable key of FIG. 2A and taken along another viewpoint. FIG. 3A is a schematic cutaway view illustrating the assemblable key of the assemblable keyboard according to the embodiment of the present invention. FIG. 3B is a schematic side view illustrating the assemblable key of FIG. 3A.

Please refer to FIGS. 2A, 2B, 3A and 3B. The assemblable key 1 comprises a pedestal 10, a key structure 20, a conductive structure 31 and a bottom plate 30. The assemblable key 1' and the assemblable key 1 have similar structures. Component parts and elements of the assemblable key 1 corresponding to those of the assemblable key 1' are designated by identical numeral references, and detailed descriptions thereof are omitted. The pedestal 10 comprises a frame 11 and plural first coupling structures 14. The plural first coupling structures 14 are formed on four lateral walls of the frame 11. The key structure 20 is disposed within the frame 11. When the key structure 20 is depressed by the user, a triggering signal is generated. The bottom plate 30 is disposed under the frame 31. The conductive structure 31 comprises trace patterns that are printed on the bottom plate 30.

Moreover, the conductive structure 31 is disposed under the key structure 20 and extended to the plural first coupling structures 14. Since the conductive structure 31 is extended upwardly from a bottom side of the key structure 20 to the pedestal 10, the conductive structure 31 is distributed in a three-dimensional manner. In FIGS. 3A and 3B, the dotted lines indicate portions of the conductive structure 31.

Please refer to FIGS. 2B, 3A and 3B again. The pedestal 10 further comprises a lower part 13. In this embodiment, the lower part 11 is formed on a bottom surface of the frame 11, and the lower part 11 is a ring-shaped structure. For allowing the conductive structure 31 to be extended from the key structure 20 to the plural first coupling structures 14 in the three-dimensional manner, the conductive structure 31 is also formed on the surface of the lower part 11.

Moreover, the key structure 20 is supported by the bottom plate 30. In an embodiment, the key structure 20 comprises a keycap 21, an operating post 22 and a triggering element 23. The keycap 21 can be depressed by the user. The operating post 22 is disposed under the keycap 21. While the keycap 21 is depressed, the operating post 22 is moved downwardly. The triggering element 23 is disposed under the operating post 22. For example, the triggering element 23 is a rubbery elastomer. The triggering element 23 comprises a conductive contact 23a. As the operating post 22 is moved downwardly to push the triggering element 23, the triggering element 23 is subjected to deformation. Moreover, the conductive contact 23a and the conductive structure 31 are electrically connected with each other to generate the key signal.

Moreover, two engaging grooves 112 are respectively formed in two opposite inner sides of the frame 11, and two stoppers 221 are respectively formed on two opposite outer sides of the operating post 22. The stoppers 221 are engaged with the corresponding engaging grooves 112. While the keycap 21 and the operating post 22 are depressed and moved downward, the stoppers 221 are disengaged from the corresponding engaging grooves 112. When the keycap 21 is not depressed, the keycap 21 and the operating post 22 are moved upwardly and returned to their original positions in response to the elasticity of the triggering element 23. Consequently, the stoppers 221 and the corresponding engaging grooves 112 are engaged with each other. Since the movements of the keycap 21 and the operating post 22 are limited, the keycap 21 and the operating post 22 are not detached.

In this embodiment, the pedestal 10 and the keycap 21 have quadrilateral or square shapes. In addition, four first coupling structures 14 or four second coupling structures 14' are formed on the middle regions of the four lateral walls of the pedestal 10, respectively. It is noted that numerous modifications and alterations may be made while retaining the teachings of the invention. The number of the expansion interfaces on each lateral wall is not restricted. For example, one, two or more than two expansion interfaces are formed on each lateral wall. Consequently, the structural strength of assembling the key is enhanced, and the conductive circuit with a specified form is constructed. In some other embodiments, the pedestal 10 and the keycap 21 have other shapes. For example, the pedestal 10 and the keycap 21 have pentagonal, hexagonal or circular shaped. Consequently, the keyboard can be expanded and assembled in diversified forms.

Moreover, the shape of the first coupling structure 14 and the shape of the second coupling structure 14' are complementary to each other. The first coupling structure 14 and the second coupling structure 14' are similar to the engaging structures of puzzles. Consequently, two parts are engaged with each other. For example, the first coupling structure 14 is a convex structure with a wider front side and a narrower rear side, and the second coupling structure 14' is a concave structure with a narrower front side and a wider rear side. Moreover, the sizes and shapes of the first coupling structure 14 and the second coupling structure 14' match each other. Due to the engagement between the first coupling structure 14 and the second coupling structure 14', the adjacent assemblable keys are combined together without the need of using any other fastening elements.

As shown in FIGS. 1A and 1B, the assemblable key 1 comprises the first coupling structures 14 only, and the assemblable key 1' comprises the second coupling structures 14' only. In some other embodiments, the assemblable key comprises the first coupling structures 14 and the second coupling structures 14'.

From the above descriptions, the present invention provides the assemblable keyboard and the assemblable key. The coupling structures are formed on the lateral walls of the pedestal of the assemblable key. The conductive structure is formed on the coupling structures. Since two or more assemblable keys are combined together to transmit the key signal without the need of using a shared base, the layout space of the assemblable keyboard is saved. As mentioned above, the number of keys that can be accommodated by the base of the conventional assemblable keyboard is limited. Since the number of assemblable keys contained in the assemblable keyboard of the present invention is not limited, the assembling flexibility of the keyboard is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An assemblable keyboard, comprising:
   plural assemblable keys, wherein each of the plural assemblable keys comprises:
      a pedestal comprising a frame and a first coupling structure or a second coupling structure, wherein the first coupling structure or the second coupling structure is formed on a lateral wall of the frame;
      a key structure disposed within the frame of the pedestal to generate a key signal, wherein one of the plural assemblable keys with the first coupling structure and an adjacent assemblable key of the plural assemblable keys with the second coupling structure are combined together through engagement between the first coupling structure and the second coupling structure; and
      a conductive structure disposed under the key structure and extended to the first coupling structure or the second coupling structure of the frame, wherein when the key structure is depressed, the key signal is generated and the key signal is transmitted to the adjacent assemblable key through the first coupling structure and the second coupling structure; and
   a main control key electrically connected with a specified assemblable key of the plural assemblable keys, and comprising a keyboard processor and a transmission interface, wherein the key signal is processed by the keyboard processor, the transmission interface is electrically connected with the keyboard processor, and the key signal is transmitted to a computer host through the transmission interface.

2. The assemblable keyboard according to claim 1, wherein each of the plural assemblable keys further comprises a bottom plate, wherein the bottom plate is disposed under the pedestal, and the conductive structure is formed on the bottom plate.

3. The assemblable keyboard according to claim 1, wherein the main control key further comprises a wireless signal receiver to receive and transmit the key signal.

4. The assemblable keyboard according to claim 3, wherein the keyboard processor further comprises a key defining program, and the wireless signal receiver receives a key edit command from an application program and transmits the key edit command to the keyboard processor, wherein the key defining program defines a symbol or a function of each assemblable key according to the key edit command.

5. The assemblable keyboard according to claim 1, wherein the key structure comprises:
   a keycap to be depressed;
   an operating post connected to a bottom surface of the keycap; and
   a triggering element disposed under the operating post, and comprising a conductive contact, wherein when the keycap is depressed, the operating post is moved downwardly to push the triggering element, so that the conductive contact of the triggering element and the conductive structure are electrically connected with each other to generate the key signal.

6. The assemblable keyboard according to claim 5, wherein the triggering element is a rubbery elastomer.

7. The assemblable keyboard according to claim 6, wherein the main control key further comprises:
   a main control key pedestal with the frame and the first coupling structure or the second coupling structure of the assemblable key, wherein the first coupling structure or the second coupling structure is formed on a lateral wall of the frame;
   the key structure disposed within the frame of the main control key pedestal; and
   the conductive structure disposed under the key structure and extended to the first coupling structure or the second coupling structure of the frame of the main control key, wherein the key processor and the transmission interface are disposed within the main control key pedestal.

8. The assemblable keyboard according to claim 1, wherein a shape of the first coupling structure and a shape of the second coupling structure are complementary to each other, so that the first coupling structure and the second coupling structure are engaged with each other.

9. An assemblable key, comprising:
   a pedestal comprising a frame and a first coupling structure or a second coupling structure, wherein the first coupling structure or the second coupling structure is formed on a lateral wall of the frame;
   a key structure disposed within the frame of the pedestal to generate a key signal, wherein the assemblable key with the first coupling structure and an adjacent assemblable key with the second coupling structure are combined together through engagement between the first coupling structure and the second coupling structure; and
   a conductive structure disposed under the key structure and extended to the first coupling structure or the second coupling structure of the frame, wherein when the key structure is depressed, the key signal is generated and the key signal is transmitted to the adjacent assemblable key through the first coupling structure and the second coupling structure.

10. The assemblable key according to claim 9, wherein the assemblable key further comprises a bottom plate, wherein the bottom plate is disposed under the frame, and the conductive structure is formed on the bottom plate.

11. The assemblable key according to claim 9, wherein the key structure comprises:
   a keycap to be depressed;
   an operating post connected to a bottom surface of the keycap; and
   a triggering element disposed under the operating post, and comprising a conductive contact, wherein when the keycap is depressed, the operating post is moved downwardly to push the triggering element, so that the conductive contact of the triggering element and the conductive structure are electrically connected with each other to generate the key signal.

12. The assemblable key according to claim 11, wherein the triggering element is a rubbery elastomer.

* * * * *